Patented Dec. 24, 1935

2,025,660

UNITED STATES PATENT OFFICE 2,025,660

CELLULOSE DERIVATIVES AND PROCESS OF MAKING SAME

Robert Haller, Riehen, near Basel, and Alphonse Heckendorn, Basel, Switzerland, assignors to the firm of Society of Chemical Industry in Basle, Basel, Switzerland No Drawing. Application March 1, 1933, Serial No. 659,237. In Switzerland March 4, 1932

8 Claims. (Cl. 260—101)

The present invention relates to the manufacture of new cellulose derivatives. It comprises the process of making these products, as well as the new products themselves.

In U. S. Patent No. 1,896,892 it is shown that new cellulose derivatives are obtained by acting upon cellulose which has been brought into a reactive form, for example upon alkali cellulose, with such heterocyclic compounds as contain one or more

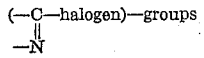

(—C—halogen)—groups
‖
—N

These products are in general stable towards alkalies and insensitive towards direct-dyeing dyestuffs and vat-dyestuffs. They are further characterized by their insolubility in the usual solvents for cellulose esters and ethers.

It has now been found that new cellulose derivatives are obtained by treating partially esterified or etherified cellulose, i. e. cellulose derivatives of the general formula

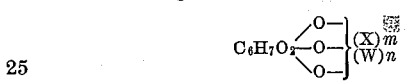

wherein X stands for an alkyl or an acyl group, W for hydrogen, $m$ for a number smaller than 3, and $n$ for the number $(3-m)$, which derivatives are soluble in the usual solvents such as acetone, chloroform, glacial acetic acid, tetrachlorethane, xylene, and the like, with a heterocyclic compound containing at least one —C—halogen group
‖
—N in the presence of an aromatic tertiary base, such as for example methyl-ethylaniline, dimethylaniline, diethylaniline, and the like. As heterocyclic compounds there come inter alia into consideration cyanuric halides, such as

or

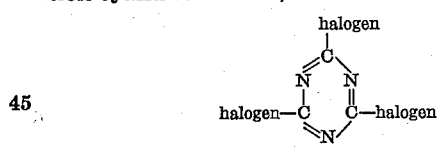

or

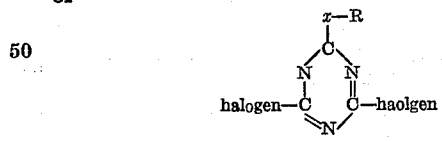

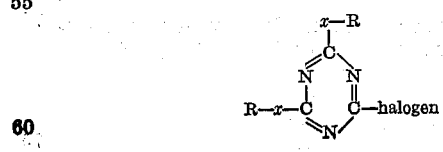

wherein $x$ stands for S, O, NH and R for H, alkyl, aralkyl or aryl, such as, for example, cyanuric chloride, cyanuric bromide, the condensation products from one or two molecules each of sulfur hydride, methylmercaptan, ethylmercaptan, thiophenol, ammonia, trimethylamine, ethylamine, benzylamine, aniline, methyl alcohol, ethyl alcohol, benzyl alcohol or phenol, and one molecule each of cyanuric chloride or cyanuric bromide, further dichloroquinazoline of the formula

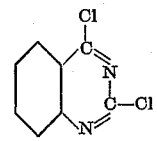

dichlorophthalazine of the formula

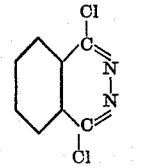

dihalides of maleic acid hydrazides of the general formula

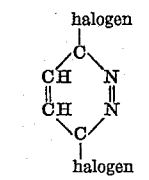

such as the dichloride of maleic acid hydrazide, tribromopyrimidine of the formula

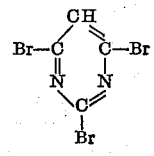

tetrachloropyrimidine of the formula

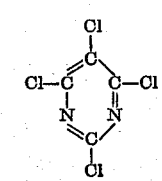

or the like.

The new products correspond to the probable general formula

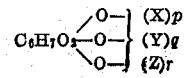

wherein X stands for an alkyl or an acyl group, Y for the grouping

which grouping, on the one part, is united by the ether linkage —O— to the C₆H₇O₂-radicle, and, on the other part, belongs to one of the aforesaid heterocyclic nuclei, and wherein Z stands for hydrogen, and $p$, $q$, and $r$ represent numbers whose sum is equal to 3, $p$ and $q$ being greater than naught, and $r$ being naught or greater than naught. The new cellulose derivatives are soluble in the solvents for alkylated or acidylated cellulose, such as acetone, chloroform, glacial acetic acid, tetrachlorethane, xylene and the like. They differ from the parent materials by an enhanced stability towards alkali. Their solubility allows of their being worked up into various forms, such as films, threads and fabrics woven from such threads, insulating material or the like. If the new products still contain exchangeable halogen atoms they can be converted into further cellulose derivatives as described, for instance, in the U. S. Patents Nos. 1,896,892 and 1,886,480.

The treatment of the partially esterified or etherified cellulose with the above mentioned heterocyclic compounds may with advantage be carried out in presence of diluents, such as chloroform, benzene, tertiary bases in excess, and the like.

The following examples illustrate some forms of carrying out the new process, but the proportions and concentrations named therein may be varied within wide limits, the parts being by weight:—

*Example 1*

10 parts of acetylcellulose, soluble in acetone and containing 41.5 per cent. of acetyl (which corresponds with an acetate of about 2½ mols.), are kneaded in a solution of 3–5 parts of cyanuric chloride and 3–5 parts of dimethylaniline in 50 parts of chloroform at 30° C. The temperature rises spontaneously to 40° C. and there is produced a tough, viscous solution, in which after an hour a precipitate is formed by addition of alcohol. The dried precipitate corresponds in its properties of solubility with the parent material, that is to say it is soluble in acetone, glacial acetic acid, pyridine and the like. It has an acetyl content of 37.5 per cent., a nitrogen content of 1.1 per cent. and a chlorine content of 0.8 per cent.

*Example 2*

10 parts of acetate silk are heated at 80° C. in a solution of 5 parts of cyanuric chloride and 5 parts of dimethylaniline in 100 parts of benzene; after cooling, the yarn is rinsed in alcohol and water. Its weight has increased by about 5 per cent; it has an acetyl content of 36.5 per cent. as compared with 41.5 per cent. before the treatment, a nitrogen content of 1.3 per cent. and a chlorine content of 0.8–1 per cent. It has the same properties of solubility as the untreated acetate silk has, but it is more stable towards alkalies.

*Example 3*

10 parts of acetyl cellulose soluble in acetone are introduced into a solution of 5 parts of tetrachloropyrimidine and 5 parts of dimethylaniline in 50 parts of chloroform; after heating to 50° C. there are added about 10–20 parts of acetone and the whole is stirred to produce a gelatinous mass. After an hour the mass is treated with alcohol to produce a precipitate which is washed and dried. This product dissolves in acetone, pyridine and the like; it has an acetyl content of 37 per cent. as compared with 40 per cent. in the parent material, a nitrogen content of 0.5 per cent. and a chlorine content of 1.3 per cent.

*Example 4*

10 parts of a commercial ethyl cellulose, consisting of a mixture of mono-, di- and tri-ethylcellulose, are stirred into a solution of 5 parts of cyanuric chloride and 5 parts of dimethyl-aniline in 50 parts of benzene, and the whole is heated during 1 hour at 70–80° C. After cooling, petroleum ether is added to the viscous solution to produce a precipitate which is washed and dried. As compared with the parent material it has somewhat diminished properties of solubility; its nitrogen content is 3 per cent. and its chlorine content 3.6 per cent.

What we claim is:—

1. A process for the manufacture of new cellulose derivatives, consisting in treating cellulose derivatives of the general formula

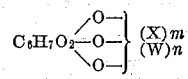

wherein X stands for an alkyl or an acyl group, W for hydrogen, $m$ for a number smaller than 3, and $n$ for the number $(3-m)$, in presence of an aromatic tertiary base with heterocyclic compounds which contain at least once the —C—halogen group
‖
—N 2. A process for the manufacture of new cellulose derivatives, consisting in treating cellulose derivatives of the general formula

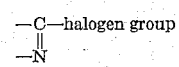

wherein X stands for an alkyl or an acyl group, W for hydrogen, $m$ for a number smaller than 3, and $n$ for the number $(3-m)$, in presence of an aromatic tertiary base with heterocyclic compounds which contain at least twice the —C—halogen group
‖
—N in a six-membered ring.

3. A process for the manufacture of new cellulose derivatives, consisting in treating cellulose derivatives of the general formula

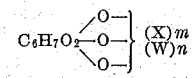

wherein X stands for an alkyl or an acyl group, W for hydrogen, $m$ for a number smaller than 3, and $n$ for the number $(3-m)$, in presence of an aromatic tertiary base with triazine compounds which contain at least twice the —C—halogen group
‖
—N in a six-membered ring.

4. A process for the manufacture of new cellulose derivatives, consisting in treating cellulose derivatives of the general formula

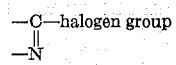

wherein X stands for an alkyl or an acyl group, W for hydrogen, $m$ for a number smaller than 3, and $n$ for the number $(3-m)$, in presence of an aromatic tertiary base with cyanuric chloride.

5. The cellulose derivatives of the probable general formula

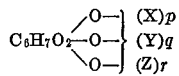

wherein X stands for an alkyl or an acyl group, Y for the grouping

which grouping, on the one part, is united by the ether linkage —O— to the $C_6H_7O_2$-radicle and, on the other part, belongs to a heterocyclic nucleus, and wherein Z stands for hydrogen, and $p$, $q$, and $r$ represent numbers whose sum is equal to 3, $p$ and $q$ being greater than naught and $r$ being naught or greater than naught, which products are soluble in the solvents for alkylated or acidylated cellulose and differ from the parent materials by an enhanced stability towards alkali.

6. The cellulose derivatives of the probable general formula

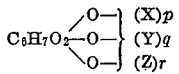

wherein X stands for an alkyl or an acyl group, Y for the grouping

which grouping, on the one part, is united by the ether linkage —O— to the $C_6H_7O_2$-radicle and, on the other part, belongs to a six-membered heterocyclic nucleus, and wherein Z stands for hydrogen, and $p$, $q$, and $r$ represent numbers whose sum is equal to 3, $p$ and $q$ being greater than naught and $r$ being naught or greater than naught, which products are soluble in the solvents for alkylated or acidylated cellulose and differ from the parent materials by an enhanced stability towards alkali.

7. The cellulose derivatives of the probable general formula

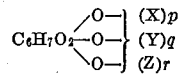

wherein X stands for an alkyl or an acyl group, Y for the grouping

which grouping, on the one part, is united by the ether linkage —O— to the $C_6H_7O_2$-radicle and, on the other part, belongs to a triazine nucleus, and wherein Z stands for hydrogen, and $p$, $q$, and $r$ represent numbers whose sum is equal to 3, $p$ and $q$ being greater than naught and $r$ being naught or greater than naught, which products are soluble in the solvents for alkylated or acidylated cellulose and differ from the parent materials by an enhanced stability towards alkali.

8. The cellulose derivatives of the probable general formula

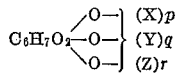

wherein X stands for an alkyl or an acyl group, Y for the grouping

which grouping, on the one part, is united by the ether linkage —O— to the $C_6H_7O_2$-radicle and, on the other part, belongs to the cyanuric chloride nucleus, and wherein Z stands for hydrogen, and $p$, $q$, and $r$ represent numbers whose sum is equal to 3, $p$ and $q$ being greater than naught and $r$ being naught or greater than naught, which products are soluble in the solvents for alkylated or acidylated cellulose and differ from the parent materials by an enhanced stability towards alkali.

ROBERT HALLER.
ALPHONSE HECKENDORN.